(12) United States Patent
Gayne et al.

(10) Patent No.: US 11,565,641 B2
(45) Date of Patent: Jan. 31, 2023

(54) APPARATUS, SYSTEM, AND METHOD OF PROVIDING A BUMPER FOR A ROBOTIC VEHICLE

(71) Applicant: JABIL INC., St. Petersburg, FL (US)

(72) Inventors: Jarrett Gayne, St. Petersburg, FL (US); Harald Portig, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 154 days.

(21) Appl. No.: 17/043,608

(22) PCT Filed: Mar. 29, 2019

(86) PCT No.: PCT/US2019/024812
§ 371 (c)(1),
(2) Date: Sep. 29, 2020

(87) PCT Pub. No.: WO2019/191572
PCT Pub. Date: Oct. 3, 2019

(65) Prior Publication Data
US 2021/0016733 A1   Jan. 21, 2021

Related U.S. Application Data

(60) Provisional application No. 62/649,687, filed on Mar. 29, 2018.

(51) Int. Cl.
*B60R 19/18* (2006.01)
*B60R 21/013* (2006.01)
(Continued)

(52) U.S. Cl.
CPC ............ *B60R 19/18* (2013.01); *B25J 5/00* (2013.01); *B25J 19/0091* (2013.01);
(Continued)

(58) Field of Classification Search
CPC ...... B60R 19/18; B60R 19/023; B60R 21/013; B60R 2019/1806; B25J 5/00; B25J 19/0091; B25J 19/063
See application file for complete search history.

(56) References Cited

U.S. PATENT DOCUMENTS 3,823,968 A * 7/1974 Barenyi ............... B60R 19/26
293/137

FOREIGN PATENT DOCUMENTS

EP          592714 A1 *  4/1994  ............ B60R 19/26
JP        11020579 A  *  1/1999

\* cited by examiner

*Primary Examiner* — D Glenn Dayoan
*Assistant Examiner* — Melissa Ann Bonifazi
(74) *Attorney, Agent, or Firm* — Thomas J. McWilliams; Barnes & Thornburg LLP

(57) ABSTRACT

An apparatus, system and method capable of providing a bumper capable of providing decreasing reversionary impact forces upon an impacting collider as the bumper is compressed. The apparatus, system and method may include at least a bumper cover; and a scissor mechanism housed within the bumper cover. The scissor mechanism may comprise a forward extension member proximal and having a parallel axis that is at least substantially parallel to a parallel tangential axis of the bumper cover; a rear extension member substantially parallel to the forward extension member, and distal from the flexible bumper; at least left and right long scissor members that are rotatably and slidably associated with respective slots in the forward extension member, and that, are rotatably associated with the rear extension member; and at least left and right short scissor members that are rotatably associated with the front extension member, and that are rotatably associated with a respective one of the left and right long scissor members.

20 Claims, 14 Drawing Sheets

(51) Int. Cl.
*B60R 19/02* (2006.01)
*B25J 5/00* (2006.01)
*B25J 19/00* (2006.01)
*B25J 19/06* (2006.01)

(52) U.S. Cl.
CPC ........... *B25J 19/063* (2013.01); *B60R 19/023* (2013.01); *B60R 21/013* (2013.01); *B60R 2019/1806* (2013.01)

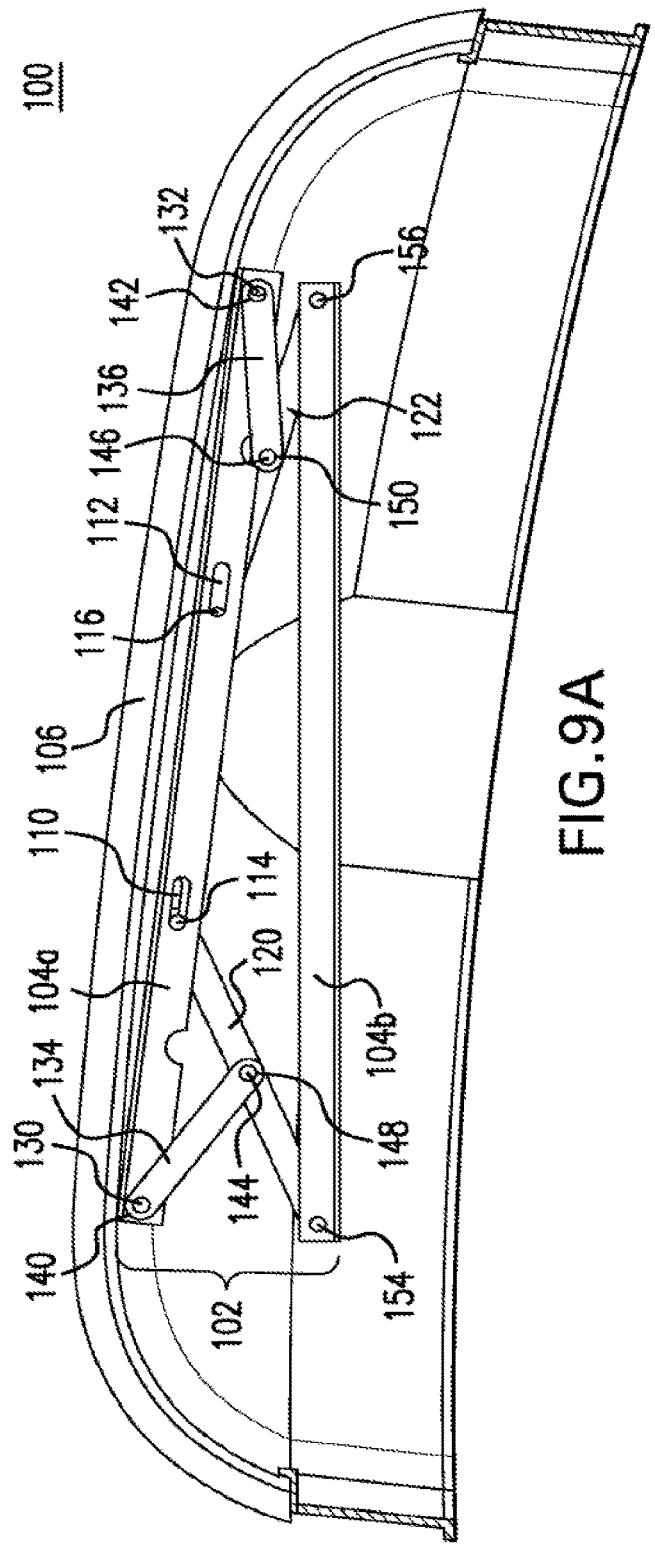
FIG.9A
FIG.9B
FIG.9C

APPARATUS, SYSTEM, AND METHOD OF PROVIDING A BUMPER FOR A ROBOTIC VEHICLE

CROSS-REFERENCE TO RELATED APPLICATION

This application is a national stage application of International Patent Application No. PCT/US2019/024812, filed Mar. 29, 2019, entitled: APPARATUS, SYSTEM, AND METHOD OF PROVIDING A BUMPER FOR A ROBOTIC VEHICLE, which claims the benefit of priority to This application claims the benefit of priority to U.S. Provisional Application No. 62/649,687, filed Mar. 29, 2018, entitled APPARATUS, SYSTEM, AND METHOD OF PROVIDING A BUMPER FOR A ROBOTIC VEHICLE, the entirety of which is incorporated herein by reference as if set forth in its entirety.

BACKGROUND

Field of the Disclosure

The disclosure relates generally to robotics, and, more particularly, to an apparatus, system, and method of providing a bumper for a robotic vehicle.

Background of the Disclosure

The bumper is very well known in the art of mobile devices and equipment. It is most typical that a bumper is, in essence, a heavy, highly rigid horizontal element across the front or back of a moving device or vehicle which provides impact absorption, such as in order to reduce damage to that mobile vehicle in a collision. It is often the case that an impact absorbing bumper is placed behind a cover, such as for aesthetic purposes and/or to improve the impact absorption provided by the bumper.

Bumper technology has advanced significantly in recent times, and has been evolving since the advent of the bumper over a century ago. For example, the common approaches for a bumper at the current time may use springs, hydraulics, and/or linear actuators in order to sense and absorb an impact. However, and by way of example, a spring compressed, such as acting in conjunction with a linear actuator, such as a slide, increases the force with which the bumper pushes back upon a collision as the bumper is progressively compressed. That is, the force imparted to a collider with the bumper upon impact further increases the more the bumper is compressed, which necessarily increases the damage incurred to the collider as the bumper is progressively impacted. This is unsurprising, given that a bumper is typically provided for the purpose of limiting damage to the vehicle being impacted by the collider, rather than the purpose of minimizing damage to the collider.

With the advent of mobile robotics, and particularly autonomous mobile robots, the possible collider with a robot may be static or dynamic, and, needless to say, a dynamic collider may include a living being, such as a human or animal. As detailed in the foregoing example, to the extent a mobile robot uses, springs, hydraulics, and/or linear actuators, but provides no significant deflection other than, for example, a crumple zone, the spring rate or actuation force of the energy absorbed by the robotic bumper in a collision will, at least in part, revert to the collider. Needless to say, this reflected force, which increases as the bumper is further compressed, may cause significant damage to the collider. This damage may depend on the weight of the robotic device and the force deflected by its bumper. Needless to say, this can lead to particularly dire consequences to the extent the collider is a living being.

More particularly, the bumper of a typical mobile robotic device lacks any safety feature to act as a last resort safety feature to protect life and physical well-being in the case of an impact by the device with an animate object within the zone of operation of the device. That is, the bumper should not only protect the robotic device from damage, but perhaps moreso must protect objects and living bystanders within the zone of operation from damage or injury.

For robots and robotic devices, industry standard PD ISO/PS 15066:2016 references that the force imparted by a moving device is roughly twice the force imparted when the device comes to rest. Thus, by way of example, a 30 lbf force imparted by a static device would lead to a 60 lbf force delivered by that device in motion. In relation to this statement and for a very heavy operating device, such as a large mobile robotic device, the addition of a high spring constant for a spring within the device's bumper, as referenced above, actually exacerbates this duplicative reversionary force that the bumper may impart to a living being.

SUMMARY OF THE DISCLOSURE

The disclosure is and includes at least an apparatus, system and method capable of providing a bumper capable of providing decreasing reversionary impact forces upon an impacting collider as the bumper is compressed.

The apparatus, system and method may include at least a bumper cover; and a scissor mechanism housed within the bumper cover. The scissor mechanism may comprise a forward extension member proximal and having a parallel axis that is at least substantially parallel to a parallel tangential axis of the bumper cover; a rear extension member substantially parallel to the forward extension member, and distal from the flexible bumper; at least left and right long scissor members that, proximally to the bumper cover, are rotatably and slidably associated with respective slots in the forward extension member, and that, distally to the bumper cover, are rotatably associated with the rear extension member; and at least left and right short scissor members that, proximally to the bumper cover, are rotatably associated with the front extension member, and that, distally to the bumper cover, are rotatably associated with a respective one of the left and right long scissor members. Upon impact, the left and right short and long scissor members may be capable of compressing the forward extension member toward the rear extension member with decreasing reversionary force along a force vector along an impact axis of an impact by the impacting collider.

The scissor member may further comprise at least one retraction spring capable of providing decompressing force to the scissor member after impact. The at least one retraction spring may be attached to the rotatable aspect of the distal rotatable association of at least one of the short scissor members with the respective long scissor member. A second end of the at least one retraction spring may be attached to an outermost portion of the forward extension member.

BRIEF DESCRIPTION OF THE DRAWINGS

The disclosure is illustrated by way of example and not limitation in the accompanying drawings, in which like references indicate similar elements, and in which:

FIGS. 9A, 9B and 9C illustrate an exemplary bumper having a scissor mechanism;

DETAILED DESCRIPTION

Figure 1:
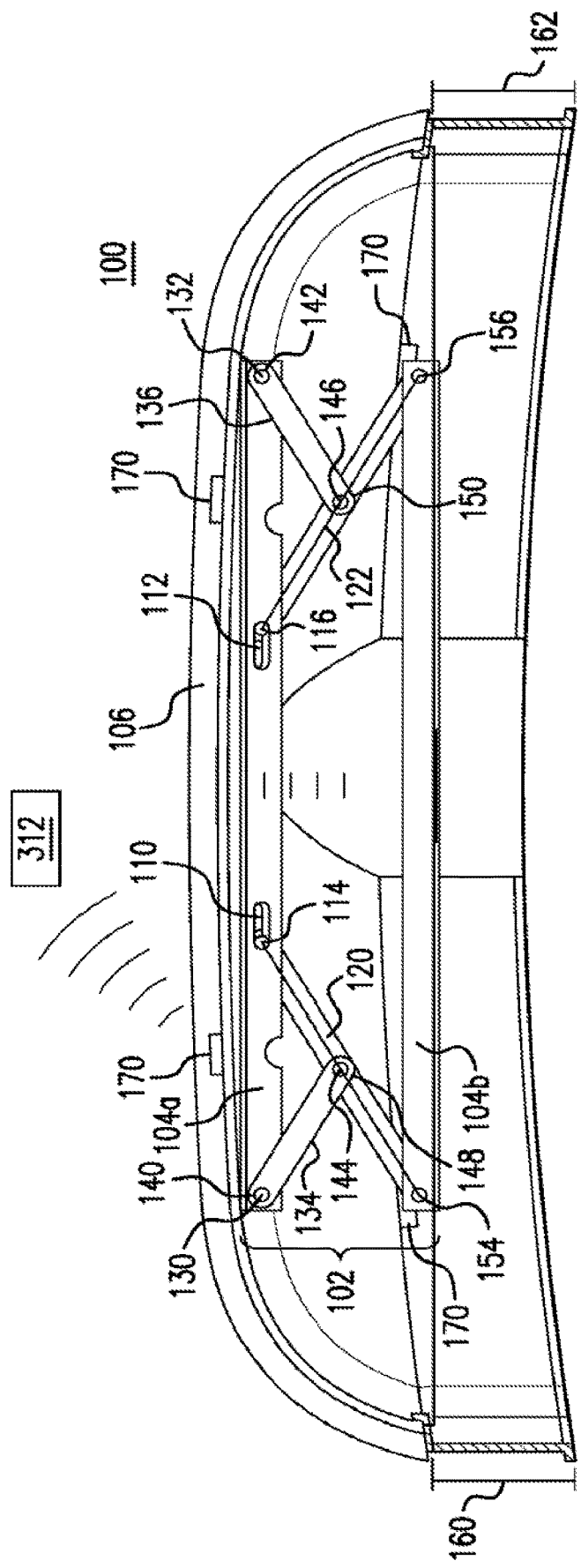
FIG. 1 illustrates an exemplary bumper having a scissor mechanism.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

In light of the foregoing, embodiments provide an apparatus, system, and method of operation for a bumper that decreases the reversionary impact force asserted by the bumper upon a collider as the bumper is compressed, rather than increasing the reversionary force asserted by the bumper as the impact progresses—which is the case in the known art. More specifically, the disclosed bumper actuates under multiple impact conditions, and is suitable to provide a reactive compression based on impact location that progressively decreases the reversionary force asserted by the bumper upon impact, regardless of impact location or impact angle. Thus, for example, a central impact on the front of the bumper may compress the entire bumper substantially equally, while decreasing the impact force asserted as the bumper is compressed. An off-center strike of the bumper may substantially compress the bumper on only one side. Further, in some embodiments, the non-strike side of the bumper during an off-center impact may actually rotate outwardly away from the mobile device in order to provide improved impact force absorption.

The foregoing is accomplished, in part, through the use of a scissor bumper mechanism that may at least partially absorb an impart, while also at least partially return the bumper to its original state following an impact, but which does not assert a spring force constant against a collider along the access of impact—that is, the reversionary force imparted by the bumper does not increase as the impact progresses.

Further, the embodiments may include an extension member in association with the scissor mechanism that may move within a slot, such as in order to allow each respective side of the scissor mechanism of the bumper to compress in an approximately linear manner, thereby improving the force distribution of an impact. Yet further, in some embodiments certain connectors, such as the forwardmost outer pin of the scissor mechanism, may be enabled with a certain amount of "play" that allows the connector(s) additional degrees of freedom of movement along the scissor mechanism, such as may allow for improved linearity of compression and consequent force distribution.

Thus, the use of retraction springs that impart spring forces away from the direction(s) of impact decouples the spring rate of the return springs from the mass of the robotic device and from the progression of impact, thus reducing the amount of impact force imparted to a collider. Thus, the scissor mechanism, such as including at least one extension element, provided herein reduces forces upon compression and after initial impact, such that, if the mobile robot comes to impact an animate object, the applied force from the bumper to the animate object would decrease after the point of initial impact. In short, embodiments allow for the separation of the mass of the robotic device from the reactionary forces presented by the bumper of the robotic device to a collider. This is distinct from the known art, in which a conventional compression spring force typically imparts a progressively increasing force as an impact progresses, based in part on the mass of the impacted robot and the spring constant rate of the bumper.

Other advantageous aspects may be presented by the embodiments. For example, the disclosed scissor mechanism may size-compress, i.e., may become smaller in total perimeter area, as it actuates upon impact, whereas conventional bumper devices may translate, thereby increasing the outer perimeter in a given direction and thus possibly enhancing damage to the device on which the bumper is present, or increasing damage to the impacted object. Needless to say, this compression of size of the bumper mechanism in the disclosure may allow for a reduced size of a robot using the disclosed bumper technology; allows for reduced damage to a bumper of a robot using the disclosed bumper; and provides improved accessibility to the interior of the robot and the bumper, such as for the performance of maintenance and service.

As detailed herein, other technologies may be provided in conjunction with the disclosed scissor bumper. By way of example, one or more cams may be provided on the outer portion of the bumper, such as in physical association with the extension member and the carriage of a device incorporating the disclosed bumper, such that a side of the bumper opposite a portion of the bumper impacted may be enabled to move outwardly so as to minimize impact and avoid damage by redirecting forces. Additionally, sensors and/or switches may be embedded within the disclosed bumper, such as to immediately stop the robotic device upon an impact, and/or indicate where an impact occurred on the bumper, substantially immediately upon actuation of the disclosed scissor mechanism.

FIGS. 1 through 5 illustrate embodiments of a bumper 100 employing the disclosed scissor mechanism 102 with at least one extension member 104, and the operation thereof, in the event of a bilateral deflection, i.e., a substantially forward impact that deflects the bumper approximately equally on both sides. More particularly, FIG. 1 illustrates a scissor mechanism bumper 100 having a scissor mechanism 102 within a bumper housing 106. More specifically, the illustrated bumper 100 includes a forward extension member 104a having two slots 110, 112 therewithin through which pins 114, 116 associated with a left long scissor member 120 and a right long scissor member 122 may ride. That is, the long scissor member pins 114, 116 may slide substantially freely within the respective slots 110, 112 to the left and to the right until the slot endpoints are reached by the pins, as discussed further herein below.

From a center point of the forward extension member 104a, outward of the left and right slots 110, 112 may be provided a pair of pins 130, 132 to respectively provide mechanical association with left and right short scissor members 134, 136. These outer pins 130, 132 may allow for rotation of the respective short scissor members 134, 136 about the respective pin 130, 132, such as upon actuation of the scissor mechanism 102 upon an impact. Of note, play may be provided between the outer pins 130, 132 and the inner circumference of the rotation holes/sockets 140, 142 for the short scissor members 134, 136. This play may improve the linearity of deflection of the bumper 100 to the extent an impact occurs off-center of the bumper 100.

The amount of play described herein may be dependent upon the type of pin employed, and/or the type of socket on the short scissor member 134, 136. By way of example, a simple pin and Cotter pin retainer may be used; a mushroom capped pin may be used; or any other pin mechanism known to those skilled in the art in light of the discussion herein may be used. Alternatively, it will also be understood by the skilled artisan that the pin 130, 132 may be highly mechanically fitted to the receiving socket 140, 142 in the respective short scissor member 134, 136, thereby eliminating the play in the pin and socket as described herein, without departing from the disclosure.

It will also be appreciated by the skilled artisan that the features illustrated in FIG. 1 may be cross-sectional in nature, and thus a hidden, mirrored scissor mechanism (not shown) may be present in addition to the features shown. In such an embodiment, the hidden scissor mechanism below and mirroring the one shown may also provide a downward and/or counteractive force that maintains the illustrated short scissor member upon the outer pins 130, 132 on the forward extension member 104a in accordance with the discussion herein.

As additionally illustrated in FIG. 1, each long scissor member 120, 122 may have the forward pins 114, 116 inserted through the slots 110, 112 in the slotted extension member 104a, may have a central pin 144, 146 for association with a socket 148, 150 in the short scissor member on an end of each short scissor member 134, 136 opposite the respective outer pins 130, 132, and may also have a respective rear pin 154, 156 associated with a substantially rigid rear extension member 104b at an outer portion thereof. It will be appreciated that the outer rear pins 154, 156 associating the long scissor members 120, 122 with the rear extension member 104b may readily allow for rotation of each long scissor member 120, 122 about its respective rear pivot pin 154, 156 in the event of compression of the bumper 100.

Thus, in the event of a strike on the bumper, each side of the bumper is imparted with up to 6 degrees of freedom of movement, and the bumper in total may be imparted with up to 12 degrees of freedom of movement. More particularly, along the forward extension member, each of the left and right sides of the forward extension member impart 4 degrees of freedom of movement, namely, the ability of each long scissor member to rotate and slide within its slot, and the ability of each short scissor member to rotate and play about its outer pin on the forward extension member. Further, each of the right and left side of the scissor bumper provides a degree of freedom at approximately the center point of the long scissor member, whereat is present a pin about which the short scissor member can pivot. And finally, each side of the scissor mechanism provides an additional degree of freedom of movement at its respective outer pin along the rigid rear extension member, because each long scissor member is capable of rotation about its respective rear outer pin.

Also illustrated in FIG. 1, and optional in the embodiments, are left and right cams 160, 162 that allow a respective side of the bumper 100 to move outwardly in a substantially linear manner away from the body of the robotic device (not shown) when the other side of the bumper 100 is impacted. Thus, the cams 160, 162 may serve as hinges about which the bumper 100 may effectively rotate, which helps to avoid the bumper 100 further damaging the frame or body (not shown) of the robotic device, and which, in part, allows for the decreased footprint of the perimeter of the bumper 100 even upon an impact, as discussed above.

Also illustrated in FIG. 1 are one or more sensors 170. The one or more sensors 170 may, as referenced above, sense actuation of any one or more features of the disclosed scissor mechanism 102, and may accordingly send data to one or more processing systems 312 associated with the robotic device such that an action may be taken by the robotic device pursuant to instruction from the processing system 312. By way of example, upon an impact to the bumper 100 as evidenced by actuation of the scissor mechanism 102, the processing system 312 may instruct the drive system of the robot to come to a full stop. Of course, other information may be provided by a sensing system, such as on which side of the mobile device the impact occurred, the force imparted by the impact, and the like.

Figure 2:
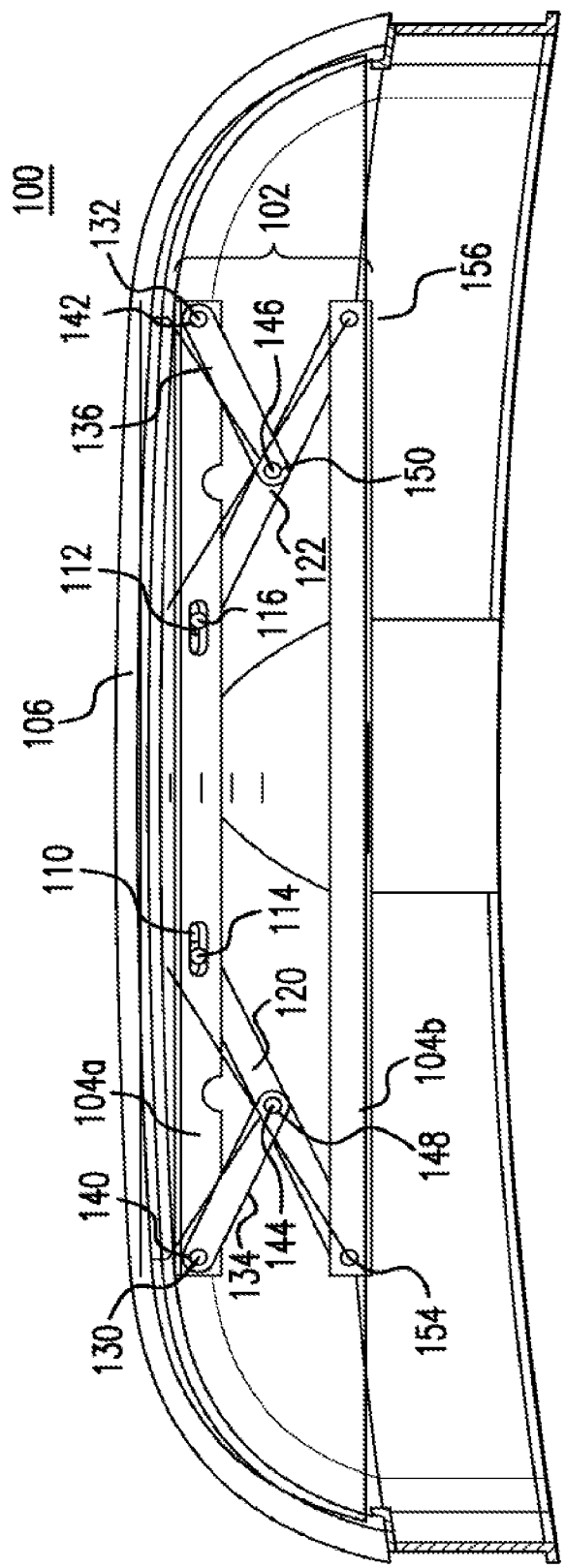
FIG. 2 illustrates an exemplary bumper having a scissor mechanism.

FIG. 2 illustrates actuation of the scissor mechanism 102 of FIG. 1 upon a substantially forward impact to the bumper 100. As illustrated, the forward and rear extension members 104a, 104b provide force absorption by moving closer together approximately equally on their respective end portions as the impact is absorbed. This increased proximity is a result of each of the short scissor members 134, 136 rotating about the outer pins 130, 132 of the forward extension member 104a, wherein the left short scissor member 134 rotates counterclockwise, and the right short scissor member 136 rotates clockwise; the long scissor member pins 114, 116 sliding towards the center point of the forward extension member 104a, and rotating within the slots 110, 112, wherein the left long scissor member pin 114 rotates clockwise and the right long scissor member pin 116 rotates counterclockwise; and each of the long scissor members 120, 122 rotating on its respective rear outer pin 154, 156 on the rear extension member 104b, with the left long scissor member 120 rotating clockwise and the right long scissor member 122 rotating counterclockwise.

Figure 3:
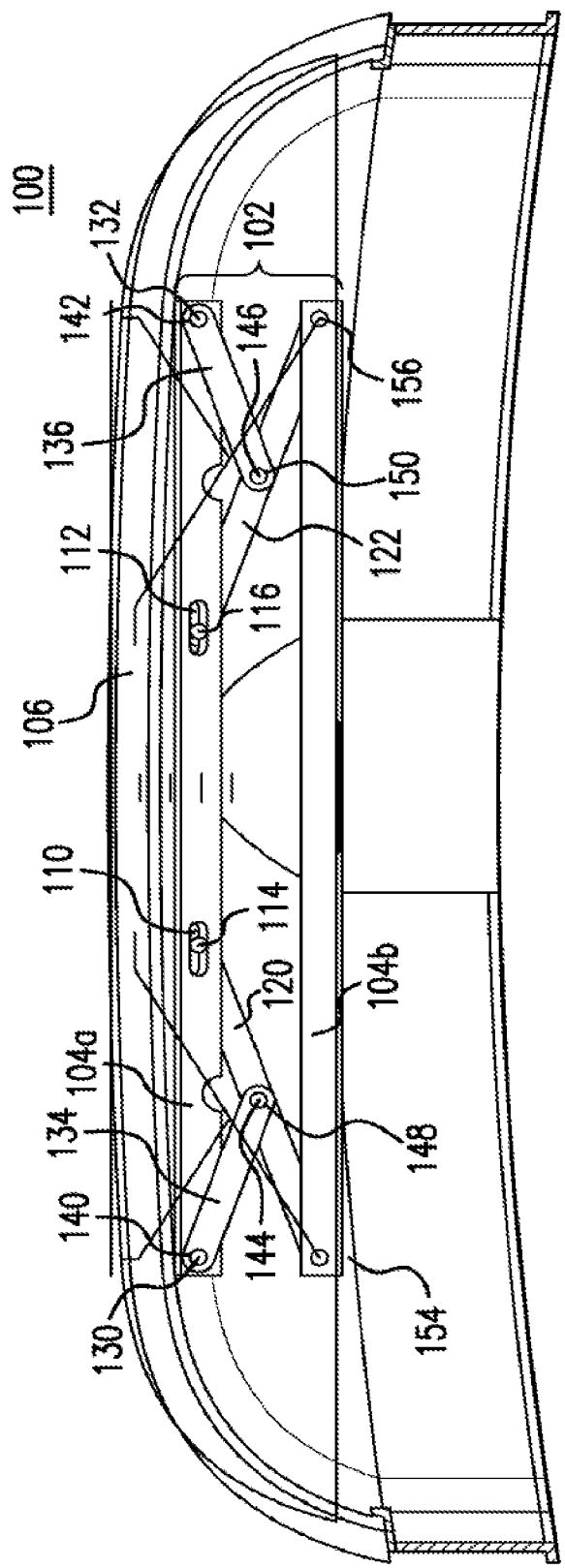
FIG. 3 illustrates an exemplary bumper having a scissor mechanism.

FIG. 3 illustrates the continuation of a substantially forward impact first imparted to the bumper 100 in the embodiment of FIG. 2. As shown, the proximity increases further between the forward extension member 104a and the rear extension member 104b, such as based on the continued changes to the degrees of freedom of movement first referenced with respect to FIG. 2.

Figure 4:
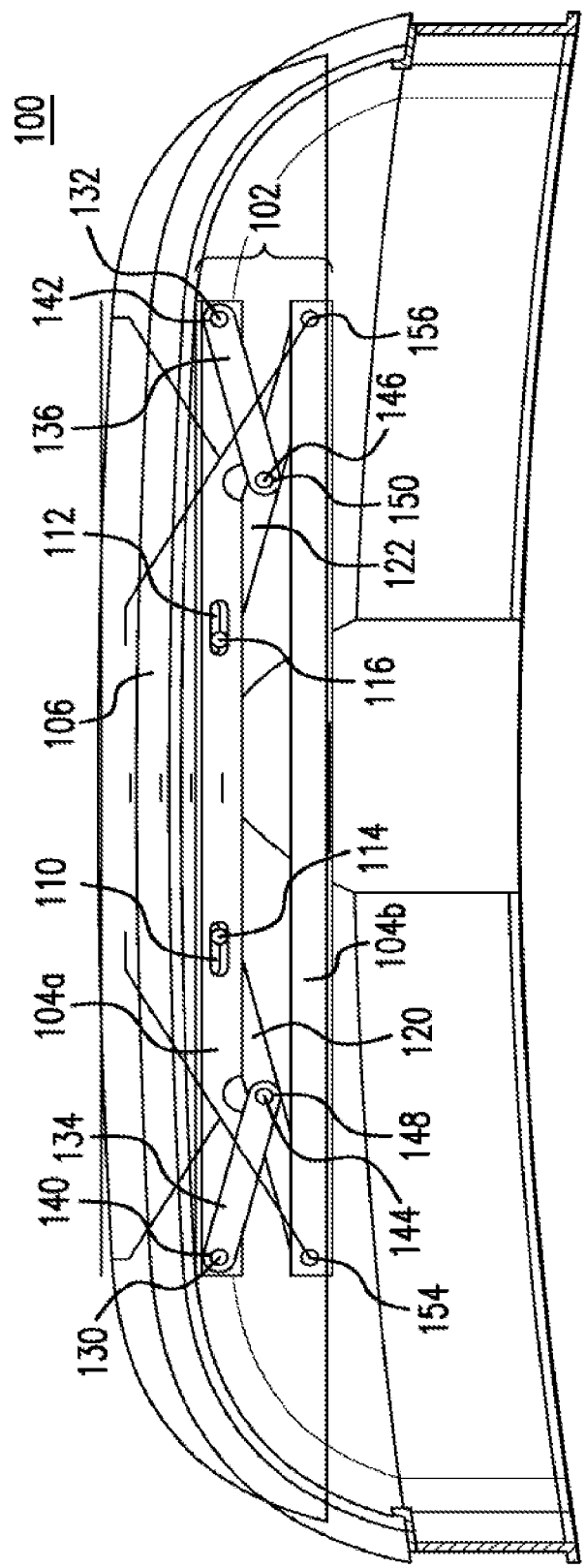
FIG. 4 illustrates an exemplary bumper having a scissor mechanism.

FIG. 4 illustrates the continued increase in proximity between the forward extension member 104a and the rear extension member 104b. Of additional note, to the extent included in embodiment, the outer cam hinges 160, 162 of the bumper 100 may allow for increased compression of the bumper 100 and consequent absorption of the impact forces without providing an increase in reversionary forces back against the impact.

Figure 5:
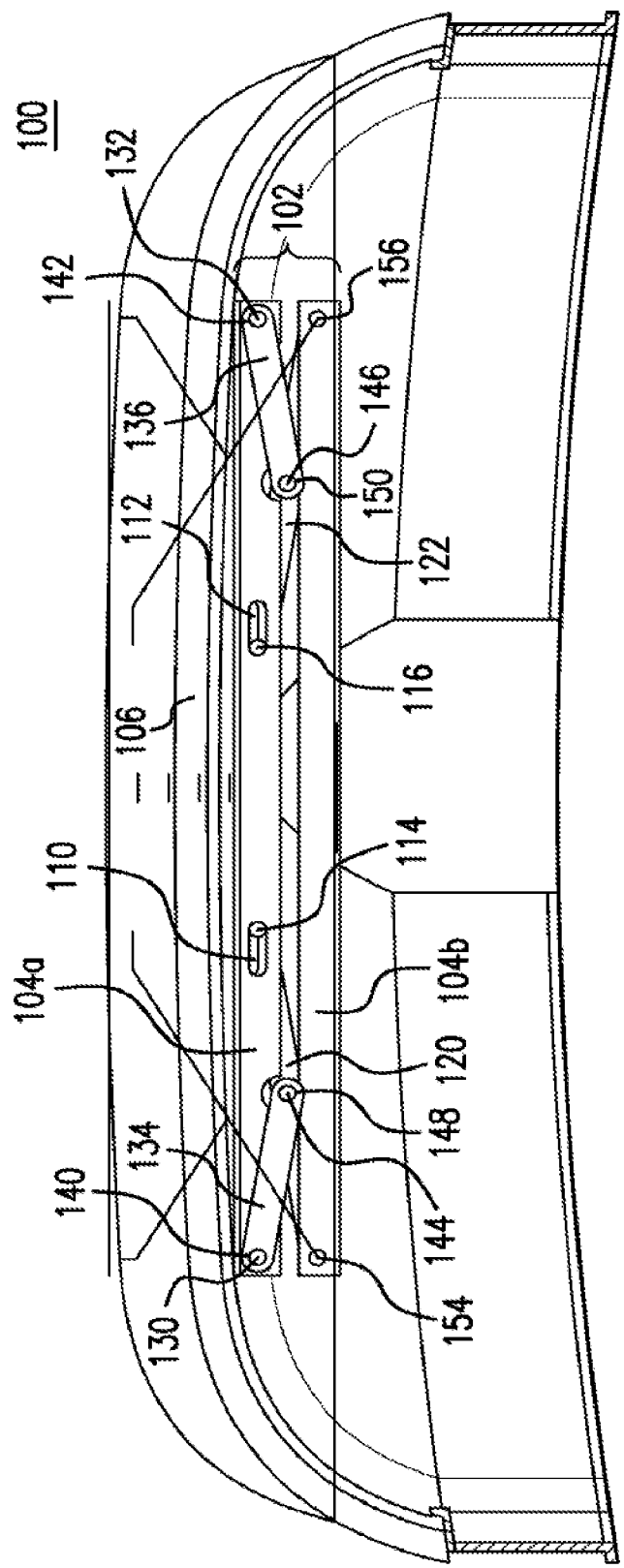
FIG. 5 illustrates an exemplary bumper having a scissor mechanism.
Figure 6:
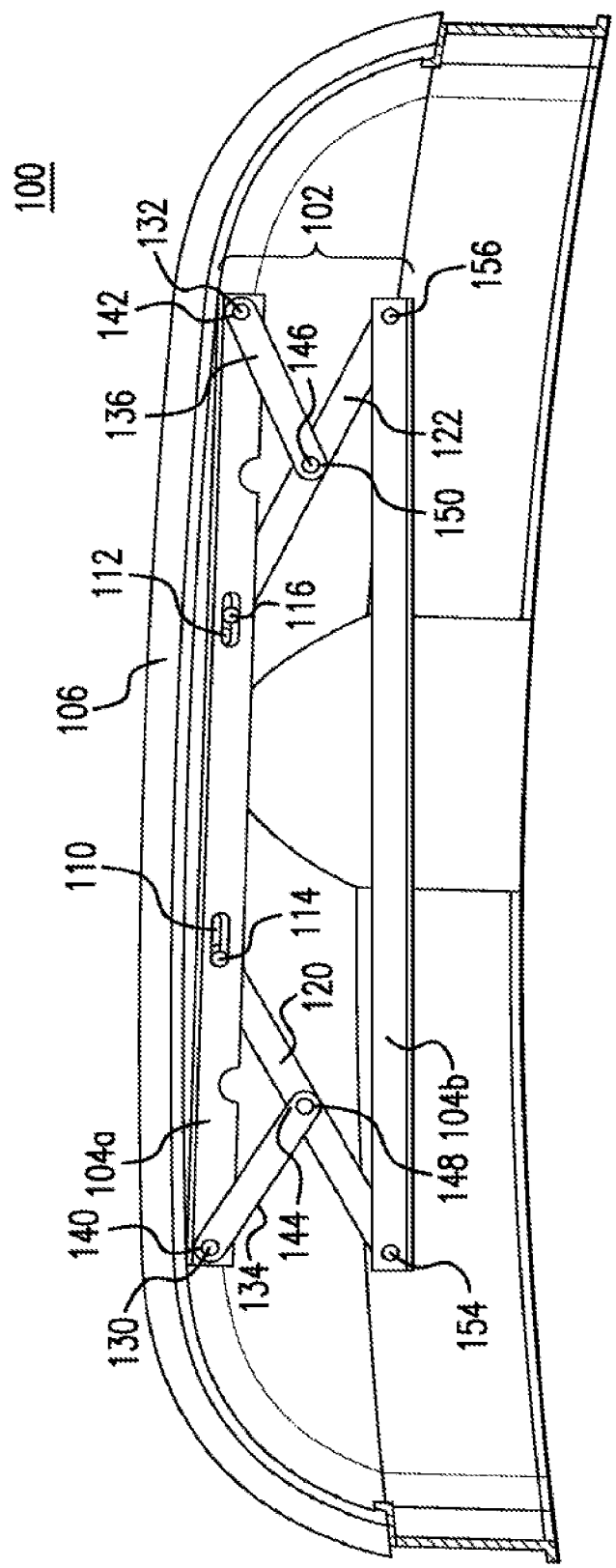
FIG. 6 illustrates an exemplary bumper having a scissor mechanism.

FIG. 5 illustrates a full compression of the disclosed scissor mechanism 102 in accordance with a substantially forward impact. As illustrated, at the point of full compression, each of the respective long scissor members 120, 122 may have reached a stopping point by having its respective slot pin 114, 116 abut against the center most portion of each respective slot 110, 112. As illustrated throughout, full compression of the bumper 100 occurs in the embodiments without the use of compression springs imparting forces back against a collider that causes the impact. Further, and as noted above, in certain embodiments each of the occurrences of FIGS. 1 through 5 may be mirrored by an identical or substantially identical spring mechanism with extension members "below" the one shown (i.e., embedded within the page of the figure).

FIGS. 6 through 9 illustrate a substantially one-sided deflection of the disclosed scissor mechanism 102. More specifically, in FIG. 6, an impact occurs on the right side of the bumper 100 as illustrated. As is evident, the right long scissor member 122 and right short scissor member 136 have actuated so as to compress the forward extension member 104a towards the rear extension member 104b. However, the left long scissor member 120 and left short scissor member 134 have, as discussed above, also been actuated, but this actuation may be reversed from the compression actuation discussed above with respect to FIGS. 2 through 5. That is, the left long 120 and short 134 scissor members begin a clockwise rotation around the respective left side pivot points, such that, on its left side of the scissor mechanism 102 only, the forward extension member 104a and rear extension member 104b are decompressed from one another as the impact progresses.

Figure 7A:
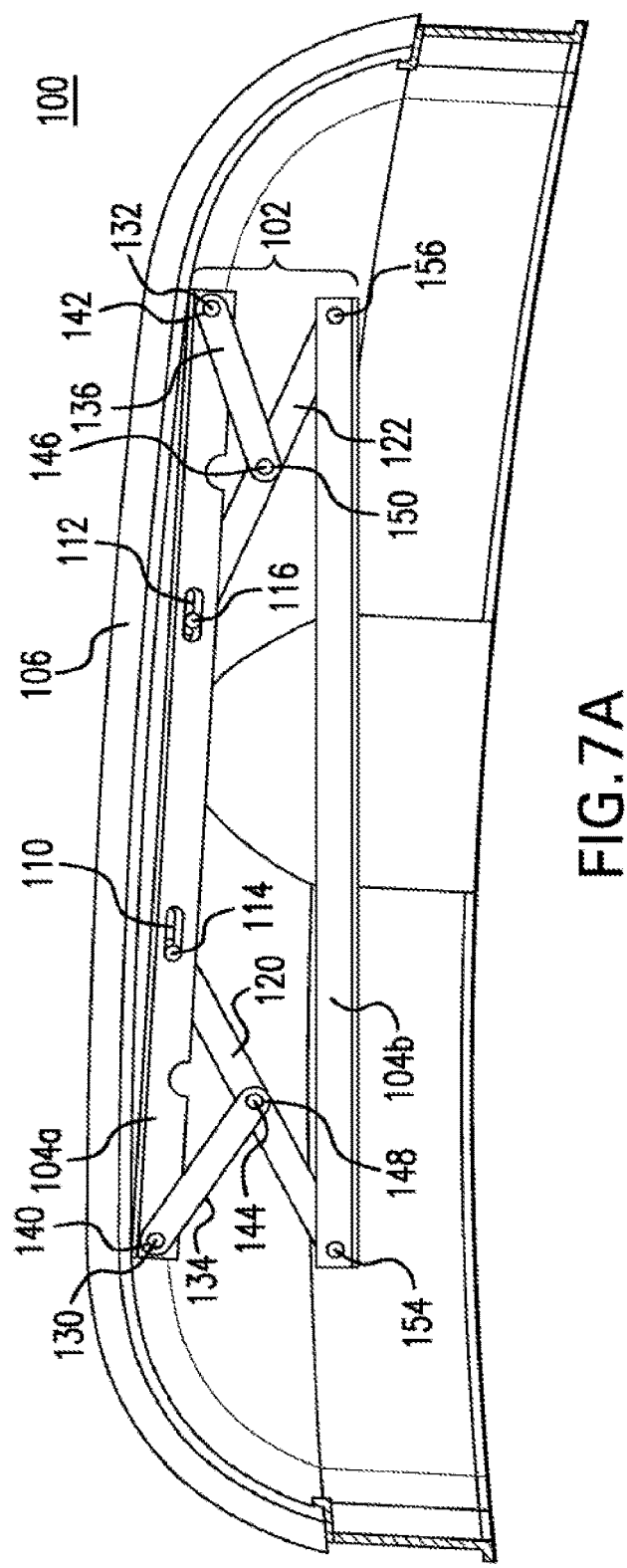
FIGS. 7A and 7B illustrate an exemplary bumper having a scissor mechanism.
Figure 7B:
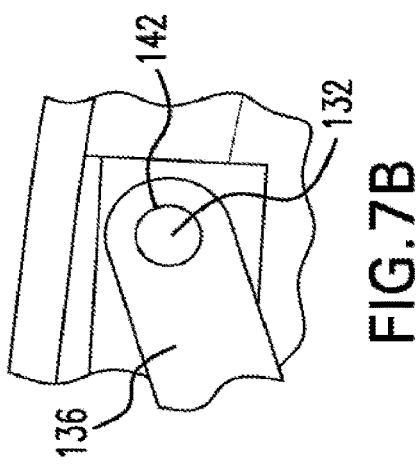

FIGS. 7A and 7B illustrate the continued compression on the right side of the bumper 100 as shown, and decompression on the left side of the bumper 100, using the disclosed spring mechanism. Of note, FIG. 7B illustrates the performance of the socket 142 of the right short scissor member 136 about the forward outer pin 132 on the forward extension member 104a having play therein. As shown, in such an embodiment, the socket 142 may rotate slightly away from the compression direction of the bumper 100 about its outer pin 132 of the forward extension member 104a. It should also be noted, particularly with respect to the embodiment of FIG. 7A, that the cam hinges 160, 162, a referenced herein and to the extent present, may receive the impact of the bumper on the right side by compressing, and may allow for an outward extension of the bumper on the non-impacted side, i.e., the left side in this illustration.

Figure 8A:
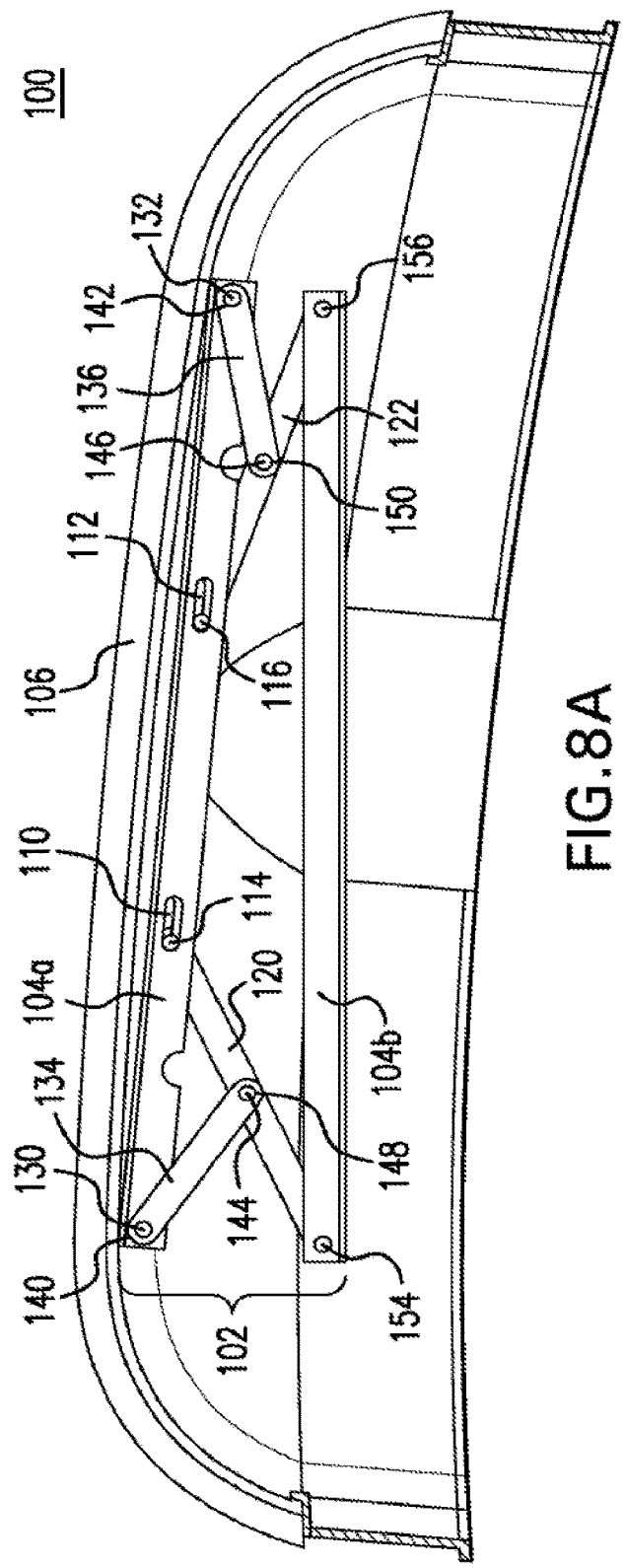
FIGS. 8A and 8B illustrate an exemplary bumper having a scissor mechanism.
Figure 8B:
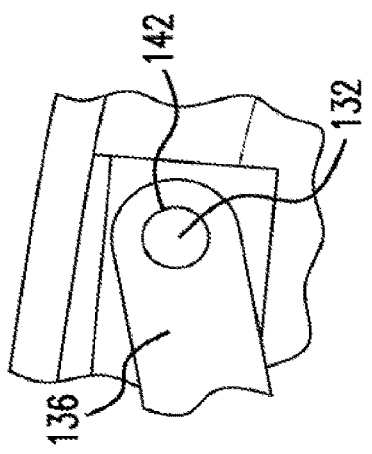

FIGS. 8A and 8B show the continued absorption of an impact on the right side of the illustrated bumper 100. Of note, in FIG. 8A, if the impact is substantially distal from the center point of the bumper 100 on the right side, the left side of the scissor mechanism 102 may continue to decompress. However, to the extent the impact on the right side of the bumper 100 is closer to the center forward point of the bumper 100, the left side of the scissor mechanism 102 may compress upon continuation of the impact on the right side of the bumper 100, although the rate of compression of the left side may be substantially less than the rate of compression of the right side of the disclosed scissor mechanism 102. It is also evident from the illustration of FIG. 8B that the socket 142 of the right side short scissor member 136 about the outer pin 132 of the forward extension member 104a may continue to increase its play about the pin 132.

FIGS. 9A, 9B and 9C illustrate the full available absorption of the impact to the right side of the bumper 100. As may be noted from FIGS. 9A and 9B, the respective long scissor member pins 114, 116 within the forward extension member 104a have moved within their respective slots 110, 112 to reach their respective stopping points, thus blocking further force-absorbing movement of the forward extension member 104a toward the rear extension member 104b. Further, and as illustrated in FIG. 9C, the socket 142 of the right short scissor member 136 has reached its maximum play about the outer pin 132 of the forward extension member 104a on its right side.

Figure 10:
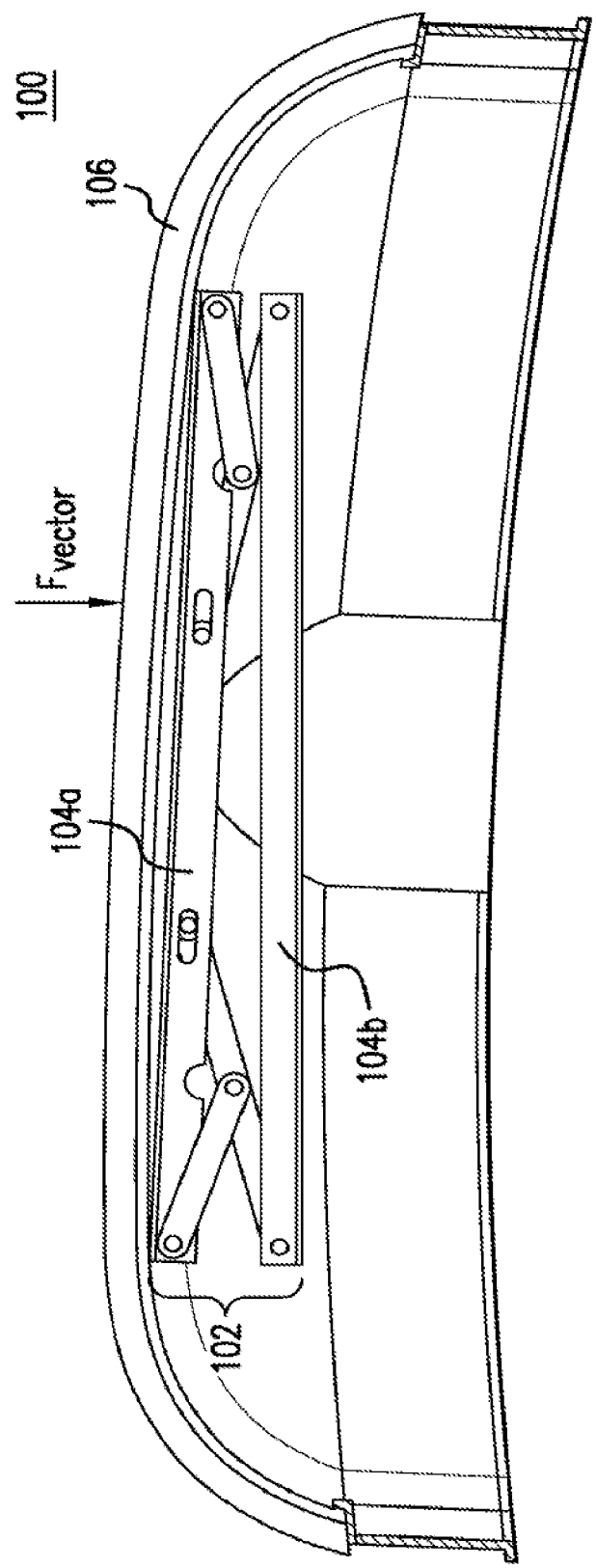
FIG. 10 illustrates an exemplary bumper having a scissor mechanism.

FIG. 10 illustrates an embodiment of the spring mechanism 102 bumper similar to that of FIGS. 6 through 9, although, in the embodiment of FIG. 10, the impact on the right side of the bumper 100 is closer to the center forward point of the bumper. As shown, as the impact point is closer to the center of the bumper 100, the non-impacted, i.e., left side in the illustration, of the bumper 100 has compressed to a substantially greater point, i.e., the distance from the forward extension member 104a to the rear extension member 104b has appreciably decreased; while the compression of the right side of the forward extension member 104a to the right side of the rear extension member 104b has remained consistent with that shown in FIG. 6 through 9.

Figure 11:
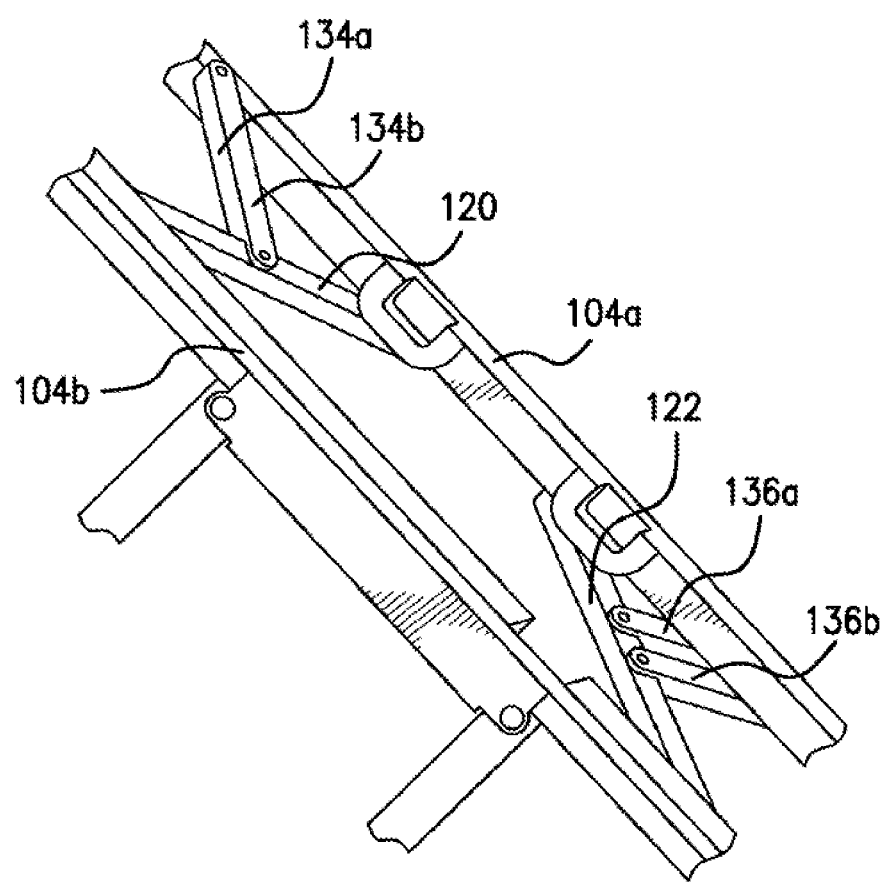
FIG. 11 illustrates an exemplary bumper having a scissor mechanism.

FIG. 11 is a profile view illustrating aspects of an embodiment similar to that of FIGS. 1-10, and including "mirrored" aspect. As shown, although aspects of the disclosed embodiments of FIGS. 1 through 10 may be single body aspects in the mirrored embodiment of FIG. 11, other aspects may have a duality in a mirrored embodiment.

More particularly, FIG. 11 illustrates a single body for the forward extension member 104a, which mates with right and left single body long scissor members 120, 122. However, the short scissor members 134, 136 of FIG. 11 are dual in nature, that is, there are two short scissor members 136a, 136b on the right side connectively associated with the forward extension member 104a, and two short scissor members 134a, 134b on the left side associated with the forward extension member 104a.

Additionally, and as shown in FIG. 11, there are dual aspects of the rear extension member 104b, such that the single body long scissor members 120, 122 may be associated between the dual aspects of the rear extension member 104b. Of course, it will be appreciated that, to the extent dual aspects are employed, the dual aspects that provide points for physical association of pins, for example, may be joined by single body aspects, and likewise single body aspects may have extensions, additional portions, and the like, such that dual aspects are provided as necessary.

Figure 12:
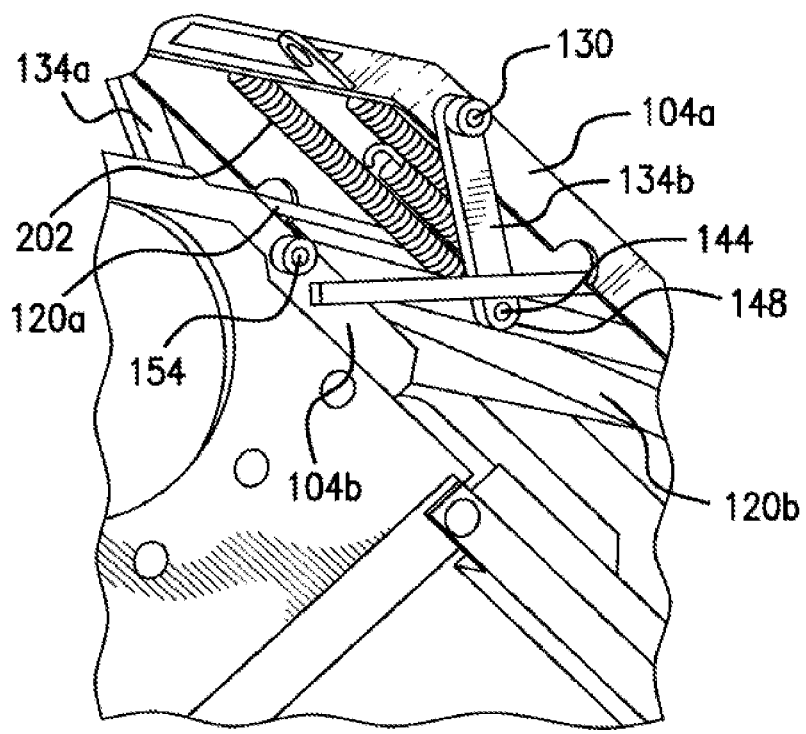
FIG. 12 illustrates an exemplary bumper having a scissor mechanism.

FIG. 12 illustrates the association of one or more side recovery springs 202 with the scissor mechanism 102 discussed herein. As shown, the side recovery springs 202 may be associated with, for example, the center pins 144, 146 on the long scissor members 120, 122, and consequently the rearmost sockets 148, 150 of the short scissor members 134, 136, such that, following compression of the scissor mechanism 102, the springs 202 pull outwardly so that the compression of the scissor mechanism 102 is decompressed. Thereby, spring-loaded recovery of the scissor mechanism 102 is made available in the embodiments without the need of a spring force rate reactively increasing against a collider as an impact to the scissor mechanism 102 continues. That is, the embodiment of FIG. 12 provides both the decreased forces upon compression that are provided by the embodiments of FIGS. 1 through 11, while additionally providing spring-loaded recovery that does not increase the reactive forces against a collider upon compression of the disclosed spring mechanism bumper.

It may further be noted from the embodiment of FIG. 12 that, while the recovery springs 202 may be physically associated within the spring mechanism bumper 100 at various points in order to allow for spring-loaded recovery, one such point may be provided by the scissor mechanism itself. As shown, the aspect of the spring 202 distal from the center of the spring mechanism 102 maybe connectively associated with the forward or rear extension member 104a, 104b of the spring mechanism 102. Thereby, the need for additional hardware is eliminated in some embodiments, and this may be significant in that the additional hardware required would need to withstand the spring rate forces applied by the disclosed recovery spring(s).

Figure 13:
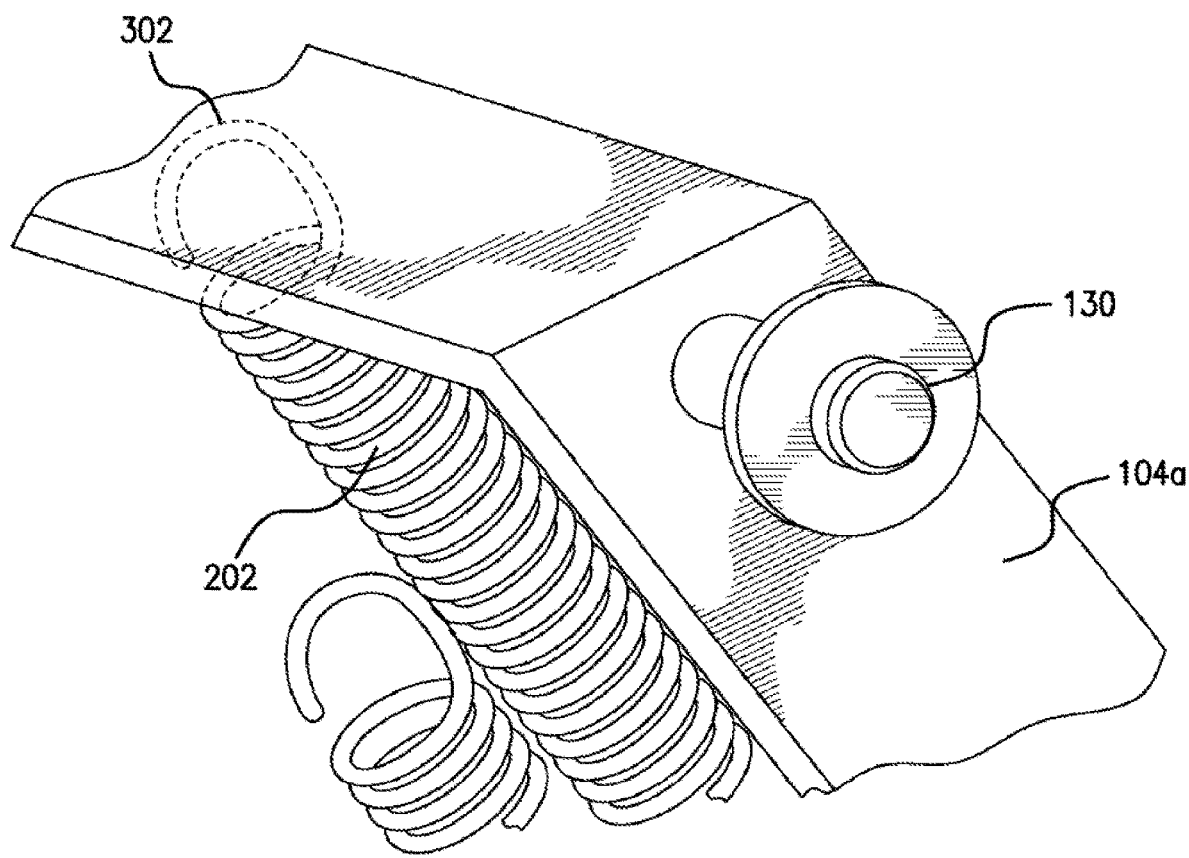
FIG. 13 illustrates an exemplary bumper having a scissor mechanism.

FIG. 13 illustrates an embodiment referenced above with respect to FIG. 12, in which one end of the recovery spring 202 is actively physically associated 302 with the outermost portion of the forward extension member 104a. Also illustrated in FIG. 13 is an exemplary outer pin 130 of the forward extension member 104a having play for the respective socket 140 of the short scissor member 134, as discussed herein throughout.

Figure 14:
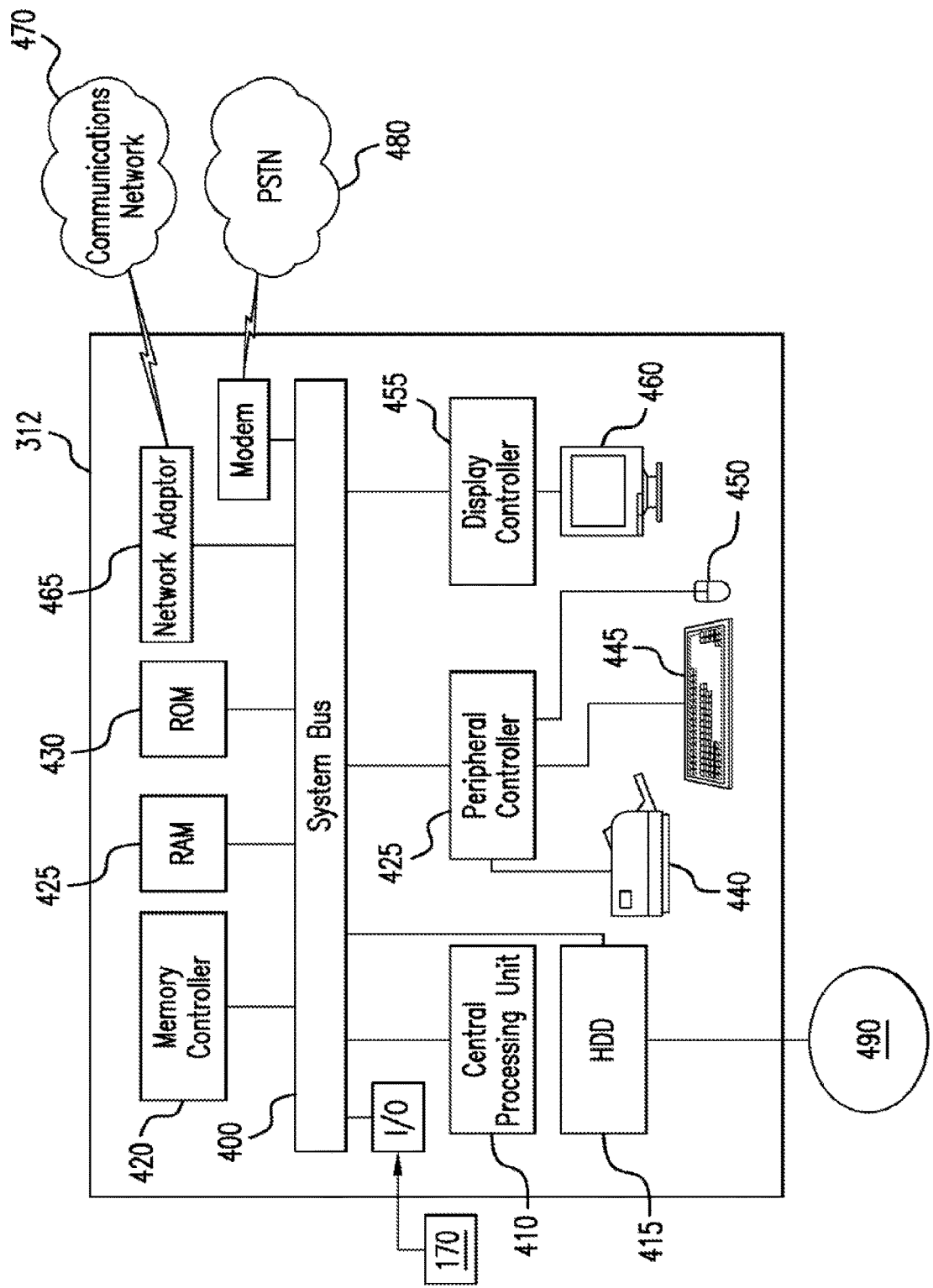
FIG. 14 illustrates a processing system for use with a mobile robotic device.

FIG. 14 depicts an exemplary computer processing system 312 for use in association with the embodiments, by way of non-limiting example. Processing system 312 is capable of executing software, such as an operating system (OS) and one or more computing algorithms/applications 490, such as those for the processing of inputs received from sensors 170. The operation of exemplary processing system 312 is controlled primarily by these computer readable instructions/code 490, such as instructions stored in a computer readable storage medium, such as hard disk drive (HDD) 415, optical disk (not shown) such as a CD or DVD, solid state drive (not shown) such as a USB "thumb drive," or the like. Such instructions may be executed within central processing unit (CPU) 410 to cause system 312 to perform the disclosed operations, comparisons and calculations. In many known computer servers, workstations, personal computers, and the like, CPU 410 is implemented in an integrated circuit called a processor.

It is appreciated that, although exemplary processing system 312 is shown to comprise a single CPU 410, such description is merely illustrative, as processing system 312 may comprise a plurality of CPUs 410. Additionally, system 312 may exploit the resources of remote CPUs (not shown) through communications network 470 or some other data communications means 480, as discussed above.

In operation, CPU 410 fetches, decodes, and executes instructions from a computer readable storage medium such as HDD 415. Such instructions may be included in software such as an operating system (OS), executable programs/applications 490, and the like. Information, such as computer instructions and other computer readable data, is transferred between components of system 312 via the system's main data-transfer path. The main data-transfer path may use a system bus architecture 405, although other computer architectures (not shown) can be used.

Memory devices coupled to system bus 405 may include random access memory (RAM) 425 and/or read only memory (ROM) 430, by way of example. Such memories include circuitry that allows information to be stored and retrieved. ROMs 430 generally contain stored data that cannot be modified. Data stored in RAM 425 can be read or changed by CPU 410 or other hardware devices. Access to RAM 425 and/or ROM 430 may be controlled by memory controller 420.

In addition, processing system 312 may contain peripheral communications controller and bus 435, which is responsible for communicating instructions from CPU 410 to, and/or receiving data from, peripherals, such as peripherals 440, 445, and 450, which may include printers, keyboards, and/or the elements discussed herein throughout. An example of a peripheral bus is the Peripheral Component Interconnect (PCI) bus that is well known in the pertinent art.

Display 460, which is controlled by display controller 455, may be used to display visual output and/or presentation data generated by or at the request of processing system 312, responsive to operation of the aforementioned computing programs/applications 490. Such visual output may include text, graphics, animated graphics, and/or video, for example. Display 460 may be implemented with a CRT-based video display, an LCD or LED-based display, a gas plasma-based flat-panel display, a touch-panel display, or the like. Display controller 455 includes electronic components required to generate a video signal that is sent to display 460.

Further, processing system 312 may contain network adapter 465 which may be used to couple to external communication network 470, which may include or provide access to the Internet, an intranet, an extranet, or the like. Communications network 470 may provide access for processing system 312 with means of communicating and transferring software and information electronically. Additionally, communications network 470 may provide for distributed processing, which involves several computers and the sharing of workloads or cooperative efforts in performing a task, as discussed above. Network adaptor 465 may communicate to and from network 470 using any available wired or wireless technologies. Such technologies may include, by way of non-limiting example, cellular, Wi-Fi, Bluetooth, infrared, or the like.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A bumper capable of providing decreasing reversionary impact forces upon an impacting collider as the bumper is compressed, comprising:
    a bumper cover;
    a scissor mechanism housed within the bumper cover, comprising:
        a forward extension member proximal and having a parallel axis that is at least substantially parallel to a parallel tangential axis of the bumper cover;
        a rear extension member substantially parallel to the forward extension member, and distal from the flexible bumper;
        at least left and right long scissor members that, proximally to the bumper cover, are rotatably and slidably associated with respective slots in the forward extension member, and that, distally to the bumper cover, are rotatably associated with the rear extension member; and
        at least left and right short scissor members that, proximally to the bumper cover, are rotatably associated with the front extension member, and that, distally to the bumper cover, are rotatably associated with a respective one of the left and right long scissor members;
    wherein the left and right short and long scissor members are capable of compressing the forward extension member toward the rear extension member with decreasing reversionary force along a force vector along an impact axis of an impact by the impacting collider.

2. The bumper of claim 1, wherein the scissor member further comprises at least one retraction spring capable of providing decompressing force to the scissor member after impact.

3. The bumper of claim 2, wherein the at least one retraction spring is attached to the rotatable aspect of the distal rotatable association of at least one of the short scissor members with the respective long scissor member.

4. The bumper of claim 3, wherein a second end of the at least one retraction spring is attached to an outermost portion of the forward extension member.

5. The bumper of claim 1, wherein the left and right short and long scissor members compress the forward extension member toward the rear extension member substantially equally on both ends of the forward extension member.

6. The bumper of claim 1, wherein the left and right short and long scissor members compress the forward extension member toward the rear extension member substantially unequally on both ends of the forward extension member.

7. The bumper of claim 1, wherein the left and right short and long scissor members compress the forward extension member toward the rear extension member on one end of the forward extension member, and decompress the forward extension member from the rear extension member on an opposing end of the forward extension member.

8. The bumper of claim 1, further comprising at least two cam hinges on either side of the scissor mechanism and each associated with at least opposing sides of the bumper cover, wherein the at least two cam hinges provide further reduction of reversionary impact forces.

9. The bumper of claim 1, wherein the bumper cover is flexible.

10. The bumper of claim 9, wherein the flexibility allows for a change in shape of the bumper cover upon a partial compression and partial decompression of the scissor mechanism.

11. The bumper of claim 10, wherein the change in shape consists of a reduction in total outer-facing perimeter of the bumper cover.

12. The bumper of claim 1, wherein the bumper cover further comprises at least one sensor that detects an impact by the impact collider.

13. The bumper of claim 1, wherein the scissor mechanism further comprises at least one sensor that detects an impact by the impact collider.

14. The bumper of claim 13, wherein the detection comprises a detection of a direction of impact.

15. The bumper of claim 13, wherein the detection comprises a detection of a force of impact.

16. The bumper of claim 13, wherein the detection effects a stoppage of a device associated with the bumper.

17. The bumper of claim 1, wherein the rotatable association of the at least left and right short scissor members with the front extension member comprises pins providing play in the rotation.

18. The bumper of claim 17, wherein the pins consist of one selected from the group consisting of cotter-pinned pins, and mushroom cap pins.

19. The bumper of claim 17, wherein the play is further provided by sockets in the short scissor members suitable for placement over the pins.

20. The bumper of claim 1, wherein the slots comprise slide stops, and wherein arrival of at least one of the rotatable and slideable attachments at its respective slide stop blocks further movement of the scissor mechanism.

* * * * *